United States Patent [19]
Rickmeier, Jr.

[11] 3,861,565
[45] Jan. 21, 1975

[54] INSULATED PITCHER

[75] Inventor: Carl H. Rickmeier, Jr., Sheboygan, Wis.

[73] Assignee: B.H.C., Inc., Sheboygan, Wis.

[22] Filed: Sept. 5, 1973

[21] Appl. No.: 394,961

Related U.S. Application Data

[63] Continuation of Ser. No. 217,914, Jan. 14, 1972, abandoned.

[52] U.S. Cl. ............ 222/131, D44/21 R, 215/13 R, 222/470
[51] Int. Cl. .......................................... A47g 19/12
[58] Field of Search ........... 222/131, 183, 470, 471, 222/559; 220/15; 215/13 R; D44/21 R, 1 M

[56] References Cited
UNITED STATES PATENTS

| | | | |
|---|---|---|---|
| 1,035,522 | 8/1912 | Boehm | 215/13 R |
| 2,805,561 | 9/1957 | Emmert | 222/473 X |
| 2,817,459 | 12/1957 | Amigone | 222/131 |
| 3,405,844 | 10/1968 | Lenz | 222/183 |
| 3,765,559 | 10/1973 | Sauey | 215/13 R |

Primary Examiner—Robert B. Reeves
Assistant Examiner—Thomas E. Kocovsky
Attorney, Agent, or Firm—Fred Philpitt

[57] ABSTRACT

A pitcher having inner and outer body members which are spaced apart from each other to form a dead air insulating chamber thereinbetween for retarding the movement of heat between the two body members. The inner body member is supported and precisely positioned by an upwardly-extending bulge in the bottom of the outer body member which engages a matching dimple in the bottom of said inner body member. A handle is attached at one end to the upper portion of the outer body member and a cover is slidably mounted over the open end of the body members. In the preferred embodiment, a thumb-engaging projection is formed in the slidable cover on the peripheral portion thereof adjacent the handle so that the cover may be slid open by the thumb of a hand which is supporting the pitcher by the handle. To facilitate the sliding action of the cover, the inner and outer body members have two parallel side surfaces which terminate on their uppermost portion in outwardly-extending flanges which the cover member is shaped to slidably engage. The inner body member is disposable and can be easily removed by sliding the cover member completely off and then withdrawing the inner body member from the outer body member.

4 Claims, 7 Drawing Figures

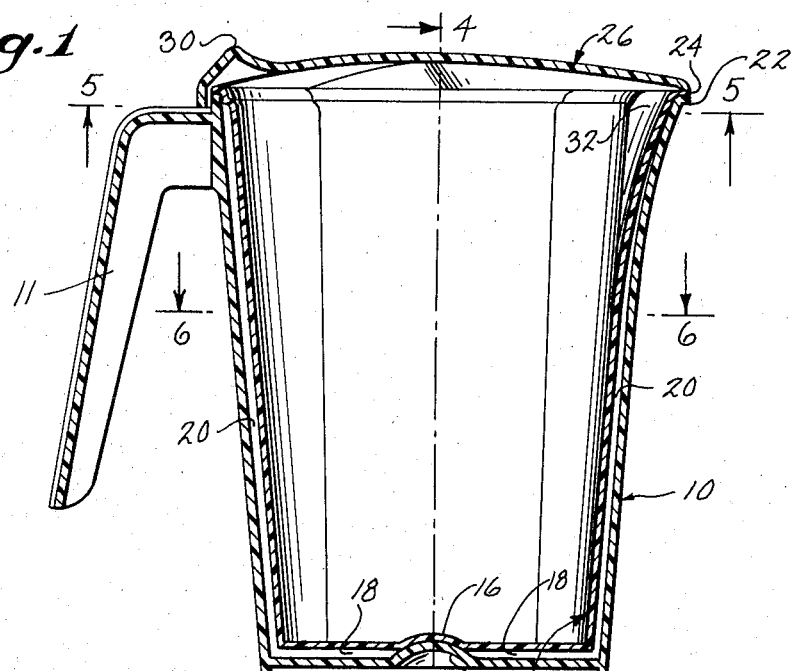
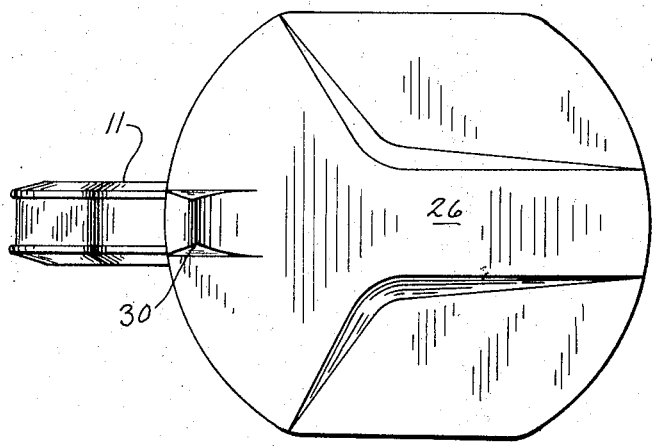
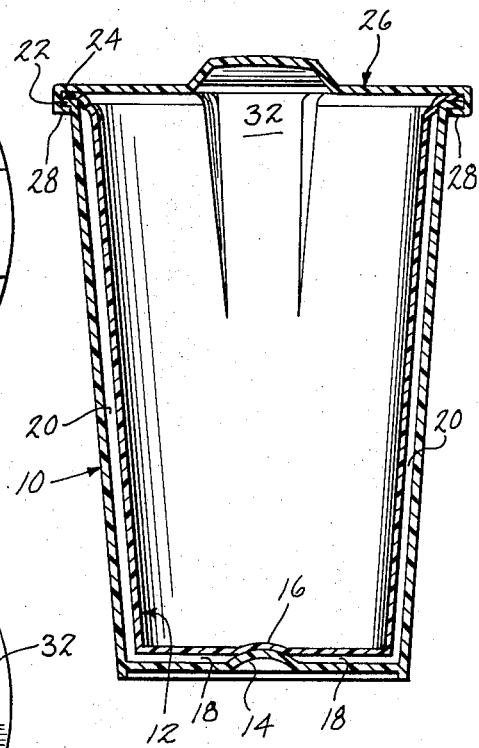
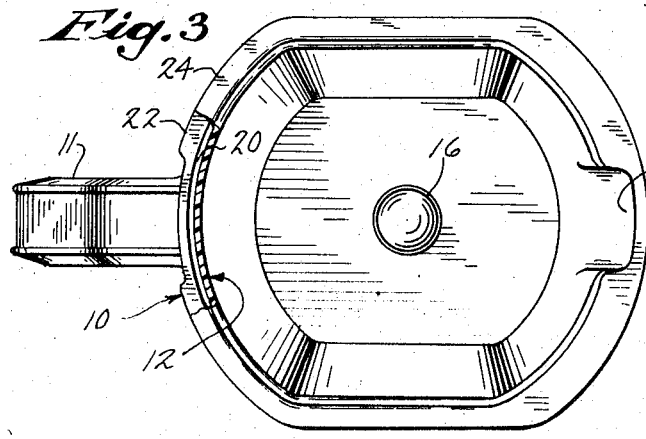

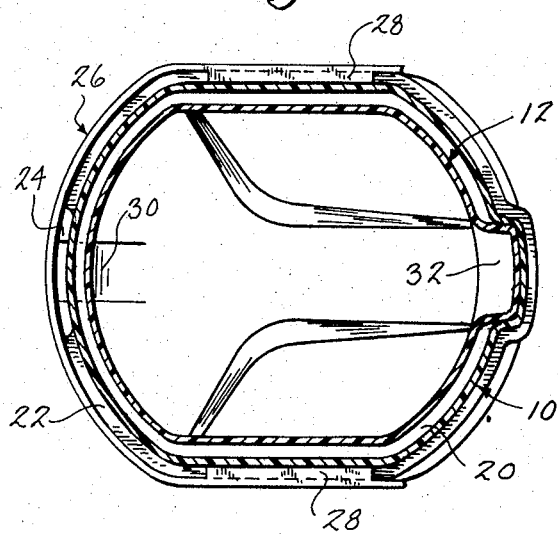
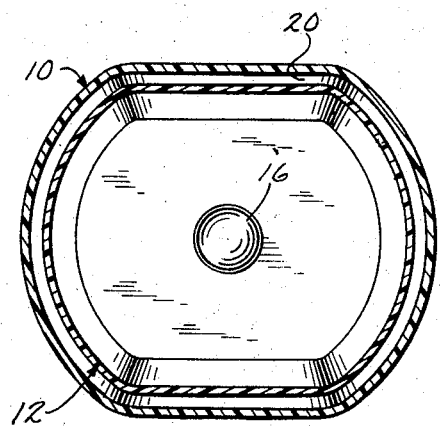
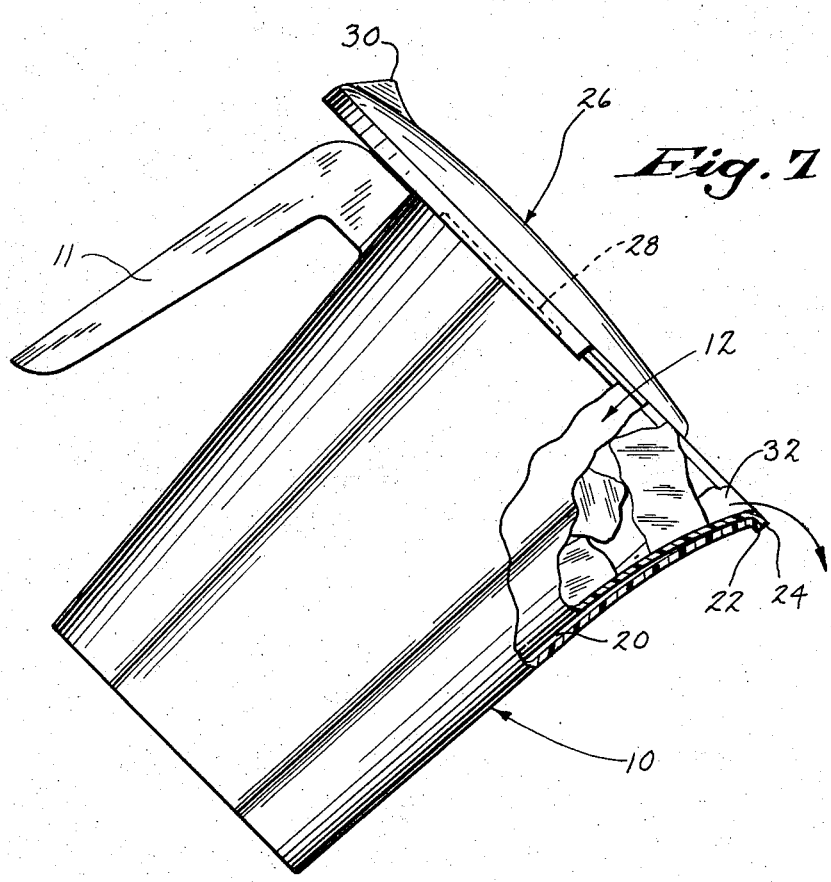

INSULATED PITCHER

This is a continuation of application Ser. No. 217,914, filed Jan. 14, 1972 now abandoned.

BACKGROUND OF THE INVENTION

This invention relates to bedside water pitchers such as used in hospitals to provide patients with a supply of cold water to drink. In the past, the ice within such pitchers tended to melt relatively quickly and necessitated frequent changing of the water to keep it cool. Accordingly, one object of this invention is to provide an insulated pitcher which will maintain ice water in the iced condition for a relatively long period of time.

Another object of this invention is to provide an insulated pitcher having a sliding cover which is easy to open and to close, or to position slightly open to act as an ice guard.

A further object of this invention is to provide an insulated pitcher having a disposable inner lining which can be easily removed and replaced.

A further object is to provide a pitcher which is durable and relatively inexpensive.

SUMMARY OF THE INVENTION

In accordance with this invention, the above objects are achieved by providing an insulated pitcher having inner and outer body members which are spaced apart from each other to form a dead air insulating chamber thereinbetween for retarding the movement of heat between the two body members. In the preferred embodiment, the inner body member is supported and precisely positioned relative to the outer body member by an upwardly-extending bulge in the bottom of said outer body member which engages a matching dimple in the bottom of said inner body member. A handle is attached at one end to the upper portion of the outer body member and a cover is slidably mounted over the open upper end of said body members. A thumb-engaging projection is preferably formed in the slidable cover on the peripheral portion thereof adjacent the handle so that the cover may be slid open by the user's thumb while the pitcher is held by the handle. To facilitate the sliding action of the cover, the inner and outer body members preferably have two parallel side surfaces which terminate on their uppermost portion in outwardly-extending flanges which the cover is shaped to slidably engage. The inner body member is disposable and can be easily removed by sliding the cover completely off and then withdrawing the inner body member from the outer body member and replacing it with a fresh inner body member.

BRIEF DESCRIPTION OF THE DRAWINGS

FIG. 1 is a cross-sectional elevational view of one illustrative embodiment of the invention;

FIG. 2 is a top view of the embodiment shown in FIG. 1;

FIG. 3 is a top view of the embodiment shown in FIG. 1 with the cover thereof removed;

FIG. 4 is a cross-sectional view taken on the line 4—4 of FIG. 1;

FIG. 5 is a cross-sectional view taken on the line 5—5 of FIG. 1;

FIG. 6 is a cross-sectional view taken on the line 6—6 of FIG. 1; and

FIG. 7 is a side view showing the pitcher filled with ice water and positioned in pouring position.

DETAILED DESCRIPTION OF THE INVENTION

Referring to the figures, one illustrative embodiment of the invention comprises a hollow outer body member 10 having a handle 11 attached thereto and a hollow inner body member 12 which is shaped and dimensioned to fit within the outer body member 10 in spaced relationship thereto in order to form a dead air insulating chamber between the two body members. Both of the body members 10 and 12 have relatively flat bottoms and open tops. The inner body member 12 is supported by a precisely positioned within the outer body member by an upwardly-extending bulge 14 in the bottom of said outer body member 10 which engages a matching dimple 16 in the bottom of the inner body member 12. The bulge 14 and the dimple 16 have the same radius of curvature, but the dimple 16 subtends a smaller arc length so as to provide a predetermined amount of air space 18 between the bottom of the inner body member 12 and the bottom of the outer body member 10. The inner body member 12 is shaped and dimensioned to provide approximately the same amount of air space in the gap 20 between the upstanding sides of the outer body member 10 and the inner body member 12. The two air gaps 18 and 20 taken together comprise an air insulating chamber which separates the inner body member 12 from the outer body member 10. This air insulating chamber is closed off on its upper surface by a peripheral junction of the outer body 10 and the inner body member 12. As best shown in FIGS. 1 and 4, the outer body member 10 terminates at its top end in a flange 22 and the inner body member 12 terminates at its top end in a matching flange 24. The flanges 22 and 24 fit against each other all the way around the top periphery of the body members 10 and 12, thereby closing off the air chamber formed by the gaps 18 and 20 and preventing outside air from being circulated within these gaps. This provides a dead air chamber having predetermined dimensions between the inner body member 12 and the outer body member 10. The dead air insulating chamber significantly retards the flow of heat in either direction thereacross, i.e., from the inner body member 12 to the outer body member 10, or vice versa. In one experiment, the embodiment of the invention disclosed in the drawings was tested to determine how long the pitcher would hold ice water in 80° ambient temperature. Starting with one-half ice and one-half water by weight, it was found that the ice took six and one-quarter hours to melt, whereas with a plain pitcher under the same conditions the ice melted in approximately three hours. It will, therefore, be clear that the dead air space between the inner and outer body members is a substantial deterrent to the movement of heat across the air gap.

In order to accommodate the sliding cover 26, two of the sides of the inner body member 12 and outer body member 10 are made parallel with each other, as best shown in FIGS. 5 and 6. The cover 26 is adapted to slidably engage the bottom of the flange 22 on both sides of the parallel portions thereof by means of a pair of inwardly-crimped runner members 28. In addition to providing a sliding surface for the top 26, the runner members 28 also hold the flanges 22 and 24 together in their linear portion so as to hold the upper end of the outer body member 10 and inner body member 12 together and whereby to seal the top of the dead air chamber between the two body members.

In order to facilitate movement of the cover, a thumb-engaging projection 30 is provided in the cover 26 adjacent to the handle 11. A spout 32 is formed in both the inner body member 12 and the outer body member 10 opposite the handle 11 and thumb-engaging projection 30. As shown in FIG. 1, the cover 26 normally covers the top of the spout 32 and in order to pour water from the pitcher the cover 26 must be moved backwardly to expose said spout, as shown in FIG. 7. Since the handle is adjacent to the thumb-engaging projection 30 on the cover 26, the cover 26 can be conveniently slid back for pouring by using the thumb of the hand which holds the pitcher by the handle 11. As shown in FIG. 7, when it is desired to pour a quantity of water from said pitcher the cover 26 can be moved back just far enough to expose the spout 32, but not far enough to allow pieces of ice to fall out during the pouring operation.

The cover 26 can be removed by sliding it back until the runners 28 disengage from the flange 22. This is done when it is desired to replace the inner body member 12 as, for example, when the pitcher is to be used by a new patient. After the cover member 26 has been removed, the inner body member 12 can be removed by simply lifting it out of the outer body member 10. Said inner body member 12 is then disposed of, the outer body sterilized, and a new inner body member 12 is inserted into said outer body member 10 in such a position that the dimple 16 will seat against the projecting bulge 14 in the bottom of outer body member 10, as hereinbefore described.

The above-described insulated pitcher can be made of any suitable materials, but plastic materials are preferable because of their relatively low cost and attractiveness.

From the foregoing description it will be clear that this invention provides an insulated pitcher which will maintain ice water in the iced condition for a relatively long period of time, and although the invention has been described in connection with one specific embodiment thereof, it should be understood that the invention is not limited to the disclosed embodiment since many changes can be made in the disclosed structure without departing from the basic spirit of this invention. Accordingly, this invention includes all such changes and modifications as fall within the scope of the attached claims.

What I claim is:

1. An insulated pitcher comprising
 a. a hollow outer body member having an open top and a substantially flat bottom,
 b. a hollow inner body member which is shaped and dimensioned to fit within said outer body member in spaced relation thereto,
 the space between said inner and outer body members constituting an air insulating chamber for retarding the flow of heat between said inner and outer body members,
 c. cover means for closing the uppermost end of said inner and outer body members,
 d. an upwardly extending bulge formed in the central portion of the bottom of said hollow outer body member,
 e. an upwardly extending bulge formed in the central portion of the bottom of said hollow inner body member,
 f. the upwardly extending bulges set forth in (d) and (e) being in essentially vertically aligned supporting relationship and having the same radius of curvature, but the bulge of the inner body member subtending a smaller arc length so as to provide the air space set forth above,
 g. said outer body member being flanged at its uppermost end, and wherein said inner body member being flanged at its uppermost end, and wherein the flange of the inner body member rests upon the flange of the outer body member, thereby closing the top margin of said air insulating chamber between said inner and outer body members,
 h. said cover being shaped to slideably engage over and partially around the flanges in said inner and outer body members so that said cover will slide in a plane perpendicular to the height axis of said inner and outer body members.

2. An insulated pitcher as defined in claim 1 wherein said cover is positionable to permit the withdrawal and replacement of the inner body member within said outer body member.

3. An insulated pitcher as defined in claim 1 wherein a handle is attached to the upper end of said outer body member, and wherein a thumb-engaging projection is formed in said cover member adjacent to said handle for opening and closing said cover member.

4. An insulated pitcher as defined in claim 3 and further comprising a spout formed in the upper periphery of said inner and outer body members opposite said handle.

* * * * *